July 21, 1964

R. H. DOYLE ETAL 3,141,171

ELECTRIC POWER TOOL

Filed Dec. 22, 1961

INVENTORS
RICHARD H. DOYLE,
LEROY N. HERMANN
AND JOSEPH S. NABER
BY Mason, Kolehmainen, Rathburn and Wyss
ATTORNEYS United States Patent Office 3,141,171
Patented July 21, 1964

3,141,171
ELECTRIC POWER TOOL
Richard H. Doyle, Mount Prospect, Le Roy N. Hermann, St. Charles, and Joseph S. Naber, Wheeling, Ill., assignors to Fastener Corporation, Franklin Park, Ill., a corporation of Illinois
Filed Dec. 22, 1961, Ser. No. 161,651
18 Claims. (Cl. 1—49)

The present invention relates to electric power tools and more particularly to electric power tools for driving fastener devices such as staples, nails or the like.

Stapling and nailing tools, commonly referred to as "tackers" and "nailers," have been extensively employed in recent years in many industrial applications. Initially hand actuated stapling tools for driving staples into a wide variety of products were employed. Some years ago, and particularly in the automotive industry, pneumatic stapling tools were developed and these pneumatic tools have become very popular, particularly in the automotive and furniture industries. Pneumatically operated tools require an air source and to this extent do not lend themselves to complete portability. Obviously, one may have a portable source of compressed air, but it involves rather large and expensive equipment, and, hence, the use of other than hand operated nailing and stapling devices have been limited to those places where a source of compressed air is available. On the other hand, electrical energy is widely available at almost every place in this country, and if an electrically operated stapling or nailing tool could be provided which was as effective as the pneumatic tools heretofore developed, the pneumatic tool might become obsolete.

For many years people have attempted to develop electric stapling and nailing tools, but without success. First of all, such tools must be able to drive staples and nails of a variety of lengths, up to several inches or more, and the problem of getting sufficient force to drive such nails or staples repetitively at high speed with a single stroke has not been solved prior to the present invention. Any satisfactory nailing or stapling tool must be portable in the sense that the user can grasp it with his hand and move it around quickly and easily, which means that the weight thereof must be limited to something of the order of a relatively few pounds. Additionally, in electric stapling and nailing tools that were heretofore utilized, so much heat is produced by the windings of the electrically operated solenoid that the tool could not be comfortably held in the hand of the user after a relatively few repeated operations.

It would be desirable to provide a completely portable electric tool that can drive in one stroke the nails and staples now employed in industry, and which can accomplish this at high speed and into any kind of material into which such nails or staples must be driven. It would, moreover, be desirable for such a tool to be useable in any location, not only in industry but in the building trades by carpenters and others for such widely varying jobs as nailing down shingles, fastening flooring, framing and the like. It would, furthermore, be desirable to provide such an electrically powered nailing or stapling device with an improved power supply which is completely portable, which is completely safe to the user, which provides means for varying the force applied to the staple or nail depending upon the material into which it is driven, which can be controlled in a simple manner and which will permit a number of tools to be operated alternately from the same power source but not simultaneously.

It would also be desirable to provide an improved solenoid construction with a very light armature and an arrangement that is completely devoid of iron. Such solenoids should preferably be provided with scavenging cooling means so that with operation it automatically cools itself. Additionally, it is desired that the winding for the solenoid provide a maximum number of ampere turns at the start of the stroke and to provide a generally linear characteristic throughout the stroke. The construction should furthermore be such that the solenoid size does not interfere with permitting the tool to get into fairly tight locations. It would furthermore be desirable to provide in such an electric nailing or stapling tool various controls which will indicate when the staple supply is almost exhausted and which will have numerous safety features so that the device cannot be actuated unless in engagement with a surface into which a staple is to be driven and the like. Means should be provided to eliminate any recoil problem and it should be possible to control the device so that the tool fires repetitively with a single actuation thereof or that it may fire only when a control means, such as a trigger or the like is actuated.

Accordingly, it is an object of the present invention to provide a new and improved electrically powered tool having the desirable features enumerated above.

It is another object of the present invention to provide an electric nailing or stapling tool having a solenoid construction which is light in weight and yet provides, in a single high-speed stroke, sufficient force to drive any staple or nail now driven by pneumatically powered tools.

It is another object of the present invention to provide an improved electric staple or nail driving tool with improved power supply for actuating the driving apparatus.

Still another object of the present invention resides in an electric nail or staple driving tool with improved solenoid means.

It is a further object of the present invention to provide an improved electric nail or staple driving tool with simple control means for indicating when the supply of nails or staples is substantially used up and for deactivating the device until a new supply is included in the device.

Still another object of the present invention resides in the provision of an electric staple driving tool with improved means for absorbing tool recoil.

Still another object of the present invention resides in an electric staple driving tool which is completely portable and can be used wherever a conventional alternating current outlet is presently available.

It is a further object of the present invention to provide an improved staple or nail driving tool which is of sturdy construction, which will give long years of foolproof operation and which may be manufactured and sold at a reasonable cost.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings in which:

FIG. 8 is a further schematic diagram illustrating another modification of the present invention;

Briefly, the present invention is concerned with an electric fastener driving tool comprising a staple or nail driving element actuated at high speed and with great force by an electrical solenoid of improved construction. Electrical control means are provided for providing the necessary energy to actuate the driving blade to drive any size nail or staple now driven by pneumatic machines of various sorts. The invention is embodied in a tool having improved solenoid means including improved means for eliminating a recoil problem, as well as improved coiling means for the solenoid. Electrical means are provided indicating when the staple supply in the magazine is low and for preventing operation when this is the case. Safety means are provided whereby the device cannot be actuated unless it is in contact with the workpiece into which nails or staples are to be driven. The device is very lightweight and portable and can be used wherever a conventional electrical power outlet is available. Means are provided whereby the force supplied to the driver can be modified by simple adjustment. In a modification of the present invention, the stapling or nail driving tool includes trigger-actuating means and the tool may be fired once with each trigger actuation or may be designed so that repetitive firing occurs as long as the trigger is held in its actuated position. The control circuit for supplying the necessary electrical energy may be one that supplies the energy to several tools and is arranged to insure alternate, as distinguished from simultaneous, firing of these tools.

Figure 1:
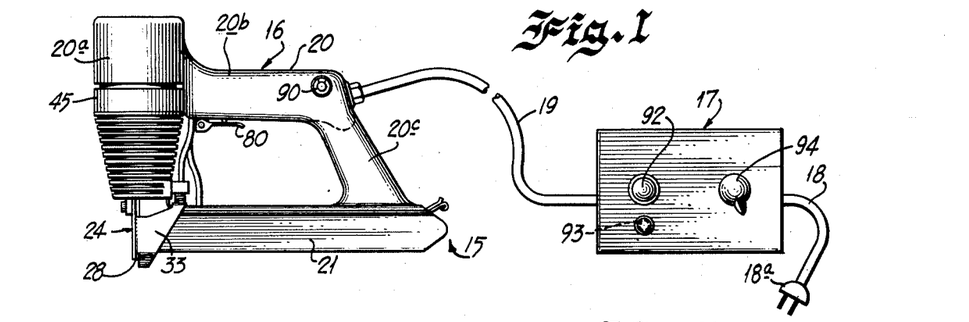
FIG. 1 is an elevational view illustrating the portable electrical fastener driving tool and power supply of the present invention.

Referring now to the drawings, there is illustrated in FIG. 1 an electrically operated tool for driving fasteners such as nails or staples, which together with the power supply is generally indicated at 15, and comprises the fastener driving tool itself, designated at 16, and a control unit 17 containing the necessary power supply. The control unit 17 has the conventional power cord 18 with the usual plug connector 18a, which may be connected to any suitable electrical outlet, such as the conventional one hundred ten volt outlet. The fastener driving tool 16 and the control unit 17 are interconnected by a power and control cable 19. The corresponding parts, whether structurally or schematically shown, are designated by the same reference numerals throughout the drawings.

Although the present invention is illustrated as employing the control unit 17, which, as will become apparent from the ensuing description, includes an isolating transformer and an energy storage device in the form of a capacitor or bank of capacitors, it should be understood that improvements on the present invention have been made, and in a number of copending applications there are disclosed and claimed improvements on the power supply. In fact, in one application, the control unit 17 is completely eliminated and all the necessary equipment is included in encapsulated form in the tool itself, such as in the handle or in a cartridge mounted in a suitable place thereon. In another copending application, there is disclosed an arangement in which the transformer is completely eliminated, as are also control relays and the like. These copending applications are Serial Nos. 161,653, 161,706, and 161,727, Doyle et al., all filed December 22, 1961, and assigned to the same assignee as the instant application.

Figure 2:
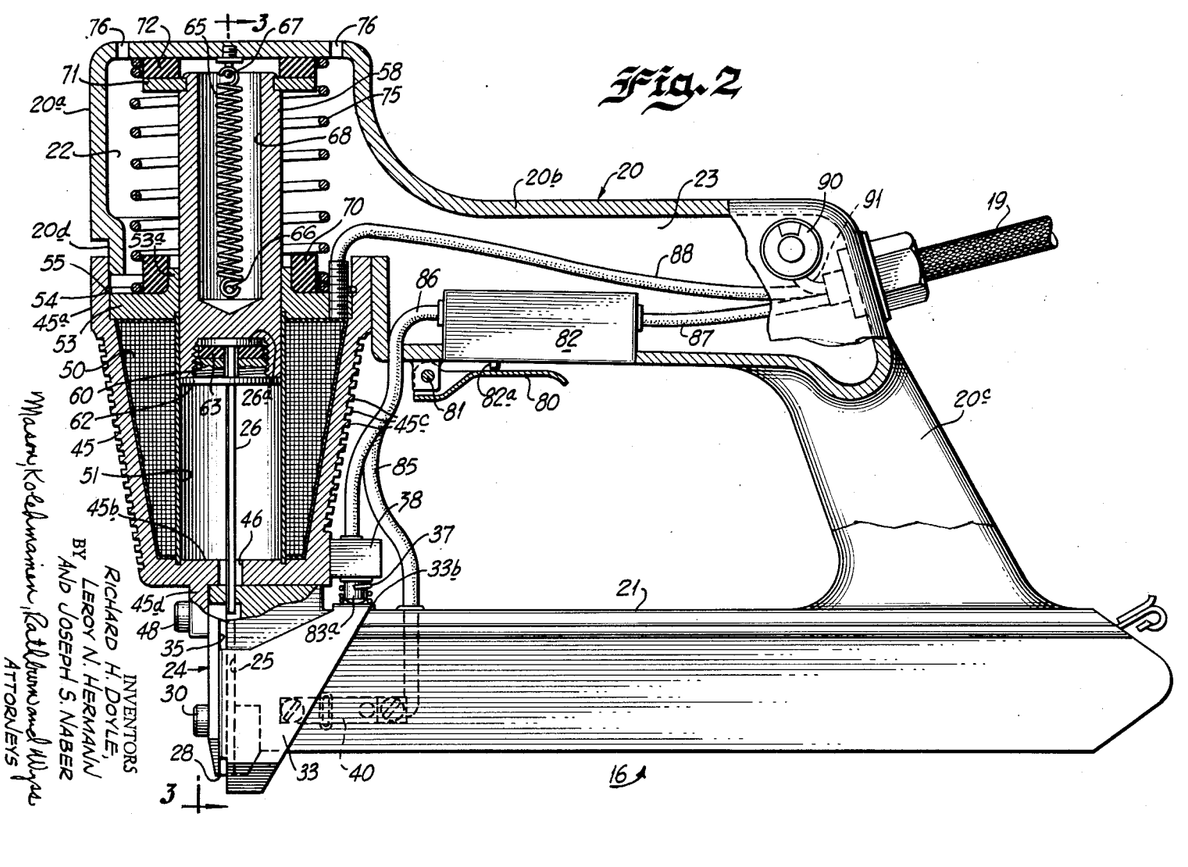
FIG. 2 is a greatly enlarged view, partly in section, of the tool portion per se shown in FIG. 1 of the drawings.
Figure 3:
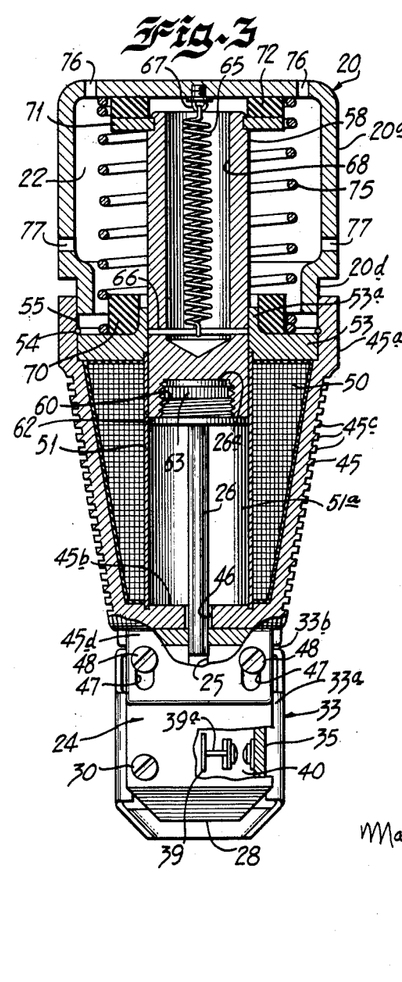
FIG. 3 is a sectional view taken on line 3—3 of FIG. 2 assuming that FIG. 2 shows the complete structure, with certain other portions cut away more clearly to illustrate the present invention, and furthermore somewhat schematically illustrating the condition when two or less fasteners are in the fastener magazine thereof.

The electric fastener driving tool 16, best shown in FIGS. 2 and 3 of the drawings, may have any well-known configuration and preferably is similar to pneumatic stapling tools, extensively used on the market, such, for example, as the stapling tools disclosed in Patents 2,931,038 and 2,953,117 or the nailing tool shown in Wandel and Doyle Patent 2,979,725. The electrically operated tool 16, which is capable of driving either nails or staples into hard substances and of withstanding the forces of shock and vibration developed in driving larger fasteners, comprises a housing 20 which includes the well-known magazine assembly 21. As illustrated, the housing 20, preferably comprising a casting of light-weight metal, such as aluminum or magnesium, includes an enlarged cylindrical head portion 20a at the front thereof defining a drive member 22. Extending rearwardly from the drive chamber 20a is an integral hollow handle portion 20b defining a handle chamber 23 therein. It will be understood that the chamber 23 may well house the control means or even the entire power supply necessary to operate the driving mechanism described hereinafter. In copending Doyle et al. application Serial No. 161,727 the chamber 23 is used for housing the entire control means and power supply in which case unit 17 is completely eliminated. The rear of the handle portion 20b is connected by a rigid, preferably integral member 20c with the rear of the magazine assembly 21, whereby the magazine assembly 21 is rigidly related to the handle portion 20b and the head portion 20a.

In order that nails or staples may be suitably driven with the "tacker" or "nailer," which the electrical tool 16 is commonly termed, depending upon whether it is used to drive staples or nails, there is provided a nosepiece assembly, generally indicated at 24 (FIGS. 2 and 3), which is carried at the end of the magazine assembly 21 spaced from the portion 20c supporting the magazine assembly. This nosepiece assembly 24 preferably defines a longitudinally extending drive track 25 therein. Staples or nails are fed one at a time from strips thereof disposed in magazine assembly 21 into the drive track 25 where they are driven by a reciprocally movable driver blade 26 movable through drive track 25 sufficiently so as to extend slightly beyond the lower end 28 of the nosepiece 24 when at the extreme end of its driving stroke. The nosepiece 24 is preferably secured to the forward end of the magazine assembly 21 by a plurality of screws or other suitable fastening means 30. It will be understood that the lower end 28 of nosepiece 24 is the portion thereof which is normally disposed in engagement with the work into which a staple or nail is to be driven.

So that the tool 16 cannot be operated except when the lower end 28 of the nosepiece 24 is in engagement with the work into which the nail or staple is to be driven, there is provided a reciprocably movable yoke member 33 having a pair of lateral flanges 33a engageable in grooves 35 defined on either side of the nosepiece 24. The rear of the yoke 33 includes a portion 33b extending over the top of the magazine assembly 21. Suitable spring means 37 are interposed between the portion 33b of the yoke 33 extending over the magazine assembly 21 and a switch housing abutment 38 rigidly secured to the magazine assembly 21 in any suitable manner. It will be apparent that the portion 33b of the yoke 33, engages the top of the magazine assembly 21, thus limiting the downward movement thereof under the bias of spring means 37. When the tool 16 is manipulated so as to tend to move the lower end 28 of the nose portion 24 into engagement with a piece of material into which a nail or staple is to be driven, the bottom of the yoke 33 will first engage the work and a slight downward pressure, such as that due to the weight of the tool 16, will cause the yoke 33 to move upwardly guided by the flanges 33a disposed in the guides or grooves 35.

The magazine assembly 21 forms no part of the present invention. It should be understood, however, that the magazine included therein will be provided with suitable means for supporting and guiding nails or staples to be fed into the drive track 25 and suitable spring means, not shown, are included in the magazine assembly 21 connected to a pusher member 39 (FIG. 3) for pushing the staples or nails toward the drive track 25, whereby as each staple is driven, another staple moves into position to be driven. This is well understood and is commonly employed in the patents referred to above, where some sort of follower or pusher element engages the rear of the staple or nail supply and pushes the entire supply toward the drive track as successive fasteners are driven. It will be appreciated that such a pusher element 39 will be moved under the force of the spring from the rear of the magazine toward the staple track 25.

In accordance with the present invention, it is desirable to prevent operation of the stapling tool 16 whenever the staple or nail supply in magazine assembly 21 decreases to a predetermined extent. To this end, and as best shown in FIGS. 2 and 3 of the drawings, there is mounted within the magazine a fastener supply switch, generally designated at 40 and comprising a pair of normally closed relatively movable contacts (shown in actuated or open position in FIG. 3 but in closed position in FIG. 4 of the drawings). A projection 39a on the pusher element 39 is adapted to open the fastener supply switch 40 when moved sufficiently forwardly in the magazine 21, which is the case when the fastener supply is substantially exhausted. Preferably when two or less fasteners remain in the magazine assembly 21, the projection 39a on the pusher 39 engages and actuates the normally closed switch 40 to the open position. The switch 40 might be one of the well-known switches, such as sold on the market under the name Microswitch or a similar arrangement, and the specific function thereof will be best understood in connection with the detailed description included hereafter. Thus far, the description of the switch 40 is primarily with respect to its location. When the projection 39a on the pusher element 39 is moved toward the rear of the magazine 21 by the presence of more than two staples in the magazine, the contacts 40 are closed. When the fastener supply in magazine 21 is substantially exhausted, the pusher element 39 will have moved forwardly and when two or less fasteners remain in the magazine 21 the switch 40 will be opened. This switch 40 and pusher 39 are shown schematically in FIG. 4 of the drawings.

As was mentioned above, the housing 20 includes the head portion 20a, which is of cylindrical configuration, and defines a chamber 22 therein. The cylindrical head portion 20a includes a cylindrical extension 20d of somewhat reduced diameter for making telescopic engagement with a cylindrical portion 45a of a housing member 45. When assembled head portion 20a and housing member 45 effectively define a solenoid chamber the upper portion of which is the chamber 22. It should be understood that housing member 45 might be integral with housing portion 20a. In accordance with the present invention, however, housing member 45 is separate and slidably related with housing portion 20a to eliminate the recoil effect when the tool 16 is used to drive very long nails or very long staples. As illustrated, the housing member 45 is preferably also formed as a casting of lightweight material, such as aluminum, magnesium, or the like, or of iron. Also in accordance with the present invention, it is of smaller diameter at the lower end thereof and tapered to a greater diameter where it telescopes with portion 20 of head 20a, as clearly shown in FIGS. 2 and 3 of the drawings. The lower end of the housing member 45 is closed, as indicated at 45b, except for an opening 46 therein through which the driver blade 26 extends in order to enter the drive track 25 in nose portion 24. Reciprocal movement of the upper portion of housing member 45 is guided by extension 20d of head 20a. In order to guide the lower portion thereof during such movement, housing member 45 is provided with an integral depending flange 45d which has a plurality of slotted openings 47 therein (FIG. 3 of the drawings) for receiving fastening means 48 which are secured to nosepiece 24. The slots or elongated openings 47 permit limited reciprocal movement of the housing member 45 relative to nosepiece 24. Preferably, the exterior of housing member 45 is provided with suitable integrally formed cooling fins 45c and with one or more longitudinally extending slots 45e that prevent the member 45 from operating as a shorted turn. Without the slots 45e, this portion of the housing 45 could act as a coil having a single convolution in which a current is induced by the collapse of the flux field when the energization of the coil or winding 50 is terminated.

In accordance with the present invention, there is provided a solenoid winding 50 disposed within the housing member 45 which defines the winding of the air core solenoid of the present invention. The winding 50 is tapered, as clearly indicated in FIG. 3, and an important feature of the present invention resides in this tapered construction as will become apparent from the more detailed description included hereinafter where the armature and other parts of the solenoid are more fully described. Disposed within the winding 50 and defining an armature chamber is a suitable armature guide member 51 formed of a non-magnetic material. The member 51 also includes a longitudinally extending slot 51a. The winding 50 and the armature guide 51 are clamped within the housing member 45 by means of a clamping or locking plate 53 which contains a central hub portion 53a which also functions as an armature guide and effectively comprises an extension of the guide 51. The locking plate 53 is preferably formed of a non-magnetic material and is held in position in housing member 45 by a suitable C-ring 54 receivable within a cooperating recess 55 in housing portion 45, as clearly indicated in FIGS. 2 and 3 of the drawings. A lightweight armature 58 is reciprocably mounted within the armature guide defined by elements 51 and 53a. The lower end of the lightweight armature 58 is preferably provided with a tapped opening or a recess 60 for receiving the head 26a of the driver blade 26. An externally threaded clamping nut 62 threadedly received within the recess 60 supports a resilient cushioning member of silicone rubber or the like 63 through which the blade 26 passes below the circular head 26a of the blade 26 to loosely secure the driving blade 26 to the armature 58. With this arrangement during a driving stroke, the armature 58 directly engages the head 26a of the driving blade 26 so that all the driving force is transmitted directly and solidly thereto. At the end of the stroke, however, the resilient cushioning member 63 permits some relative movement between the armature 58 and the driver blade 26.

For the purpose of returning the armature 58 to a position in readiness for a subsequent driving stroke, there is provided a return spring 65, illustrated as a tension spring, having one end thereof connected to the armature 58 as by a pin 66, while the other end is connected to suitable means 67 secured to the top of head portion 20a. The spring 65 is disposed within a relatively large chamber 68 defined within the armature 58, this chamber insuring that the armature 58 is of light weight so that it may be accelerated with high speed.

To cushion the armature at the end of its driving stroke, there is provided a suitable resilient bumper 70 which is disposed within the chamber 22 and is engageable by an annular flange or projection 71 suitably secured to the upper end of the armature 58. A similar resilient bumper 72 secured to the top of the head 20a within the chamber 22 cushions the return stroke of the armature under the bias of spring 65. In FIGS. 2 and 3 of the drawings, the projection 71, which could be integrally formed with the armature 58, is illustrated as in engagement with the upper resilient bumper 72. It should be understood that instead of the tension spring 65 as illustrated a compression spring disposed beneath armature 58 might be employed, or an electrical return as described hereinafter may be utilized.

For the purpose of absorbing the recoil which occurs by virtue of driving a long nail or staple, there is provided energy storage means in the form of a compression spring 75 which is disposed within the chamber 22 concentrically arranged with respect to the armature 58. The lower end of the spring 75 engages the plate 53 while the upper end of the spring engages the upper end of the housing portion 20a, as clearly shown in FIGS. 2 and 3 of the drawings, thus biasing the lower housing member 45 and the winding 50 to the lowermost position indicated in the drawings. It will be appreciated that the recoil due to the driving of the long nail or staple will tend to move the housing member 45 upwardly which is permitted by the elongated slots 47 and the telescopic fit of portions 20d and 45a. The energy of such movement is absorbed in the energy storage means 75, so that the work engaging end 28 of the nosepiece 24 remains in contact with the workpiece without the user applying a substantial force to hold it in that position. It will be appreciated that the annular projection 71 on the armature 58 will cause some air movement in its reciprocating motion within chamber 22 and, accordingly, suitable openings 76 and 77 are provided in the housing portion 20a, as clearly indicated in FIGS. 2 and 3 of the drawings. With this arrangement, operation of the armature 58 will cause cooling air to circulate through the housing and will tend to cool the solenoid comprising the armature 58 and the winding 50.

The field winding 50, which defines an air core solenoid, is tapered in accordance with the present invention for a number of reasons. In the first place, more ampere turns are available at the start of the stroke to overcome the force of the return spring 65 and also to permit very rapid initial acceleration of the lightweight armature 58. In effect, the configuration permits a more linear characteristic of the force applied to the armature 58 throughout the overall stroke thereof. Additionally, with this construction, a portion of the path of the magnetic field is diverted to extend at an angle less than ninety degrees relative to the path of movement of the armature 58 to provide an increased component of force in the direction of armature travel. The tapered winding construction 50 permits a tapered construction of the housing member 45 which furthermore requires less overhang of the tool and permits its use in areas where limited space is available. Furthermore, by utilizing a tapered solenoid, a more desirable power to weight ratio is provided. Also, a reduction is obtained in the field leakage path. The tapering of the winding 50 permits a more desirable height to diameter ratio, which ratio should be approximately unity. In a device built in accordance with the present invention, the tapered winding 50 was found to give all of the desirable results set forth above and provided a very satisfactory drive in a very lightweight tool.

The recoil mechanism comprising primarily the spring 75 and the arrangement permitting relative motion between the housing member 45 and the housing portion 20a allows the electrically actuated driving tool 16 to be held more steadily and comfortably in the hand during a driving operation. With this arrangement, the field winding 50 and the associated housing member 45 is permitted to jump or recoil while maintaining the nose-piece 24 against the workpiece. Without the recoil mechanism, the entire tool would tend to jump, allowing the driver blade 26 to protrude from the bottom of the nosepiece 24 which, of course, would tend to cause the tool to jump from the staple or nail before the latter is fully driven. In a device built in accordance with the present invention, it was found that without the recoil mechanism the tool would jump from one-half to three-quarters of an inch when driving relatively long staples, which jumping action was substantially eliminated with the recoil mechanism. Furthermore, the staple or nail is fully driven when the recoil mechanism is used and is not driven fully without. Of course, one can hold the tool without the recoil mechanism so that it does not jump, but this requires the user to employ both hands and to hold the tool with great steadiness, which would be tiring and undesirable. The recoil is primarily due to the force initially required to place the armature 58 in motion. If the housing 45 is made from magnetic material, recoil is also encountered when the lower end of the armature 58 approaches the magnetic pole provided by the portion 45b. The small air gap existing at this time results in large magnetic forces tending to move the winding 50 and the armature 58 in opposite directions.

In pneumatic nail driving and staple driving tools heretofore employed, the fastener driving operation has been initiated by the actuation of a trigger or some similar device which in turn opens an air valve of some sort. With the present invention and as illustrated in the drawings, a similar firing trigger 80 is provided pivotally mounted, as indicated at 81, to the handle portion 20b. This trigger 80 is adapted to engage the actuating plunger 82a of a suitable switch 82, which may be referred to as a trigger switch. Preferably switch 82, schematically illustrated in FIG. 4 of the drawings, is a normally open switch closed when trigger 80 is actuated. A safety switch, not shown in FIG. 2 of the drawings, but also schematically indicated in FIG. 4 of the drawings as switch 83 is provided within the switch housing abutment 38 and the actuating portion 83a of the switch 83 is visible in FIG. 2 which is engaged with the portion 33b of the yoke 33. Switch 83, like switch 82, is a normally open switch which is closed when nosepiece 24 engages the work into which a fastener is to be driven. Moreover, as is best shown in FIG. 4 of the drawings, the fastener supply switch 40, the trigger switch 82 and the safety switch 83 are all connected in series so that if any one of these switches is open, it is impossible to energize the winding 50 and, hence, to fire the tool.

To electrically interconnect these switches 40, 82 and 83, suitable insulated twin conductors 85 and 86 are illustrated in FIG. 2 of the drawings, and an insulated twin conductor 87 is illustrated as extending into the power and control cable 19, which enters the handle portion 20b, as clearly indicated in FIG. 2 of the drawings. Additionally, an insulated twin conductor 88, preferably containing power supply conductors 88a and 88b, extends from the cable 19 to the winding 50. For a purpose which will become apparent as the ensuing description proceeds, the handle 20b is provided with a suitable stepwise adjustable control and indicating button 90, which is connected by an insulated twin conductor 91 forming part of cable 19. As illustrated in FIG. 1 of the drawings, the control unit 17, preferably includes an indicating light 92, a readily replaceable fuse unit 93 and a combined switch and power control knob 94. The knob 94 controls the On-Off switch 94a, shown in FIG. 4 of the drawings. Whenever switch 94a is in the "On" position and power is supplied to the control unit 17, indicating light 92 will be lit.

Figure 4:
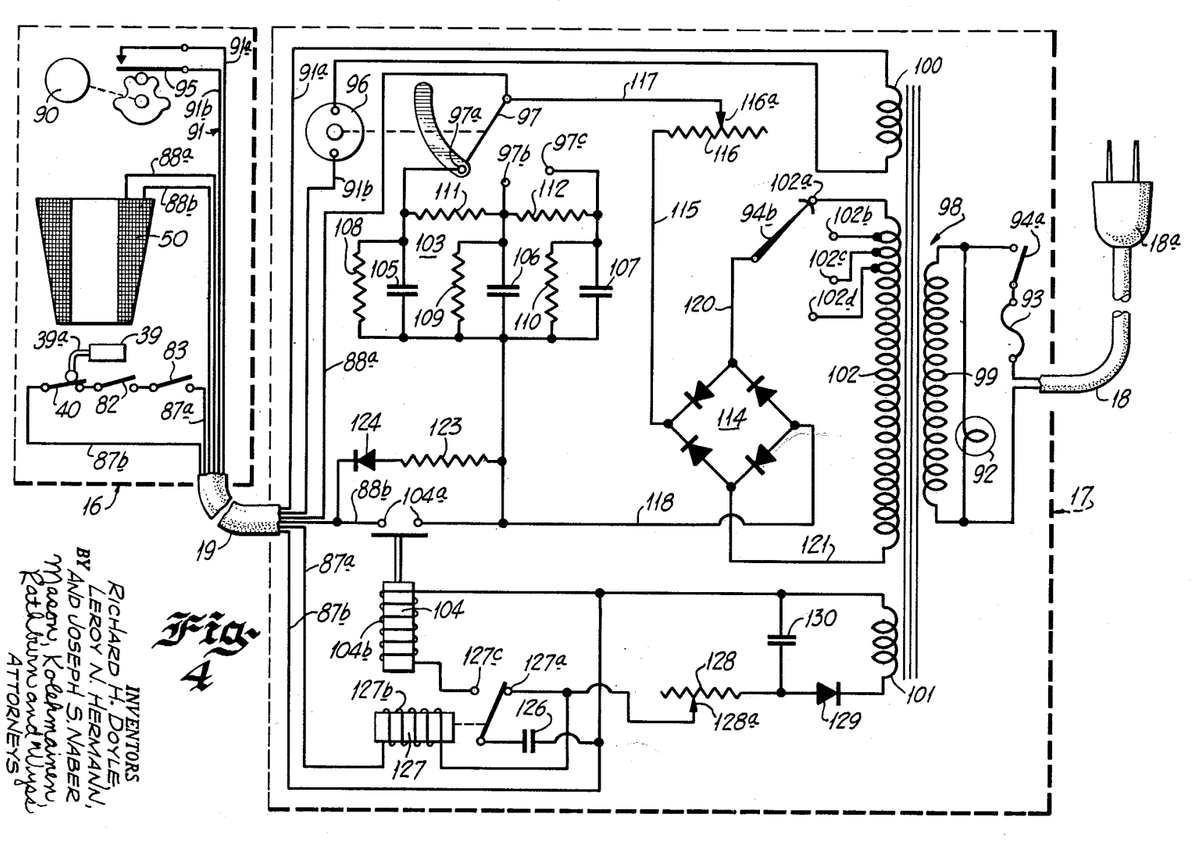
FIG. 4 is a schematic circuit diagram schematically illustrating the electrical control circuit in the arrangement shown in FIG. 1 for one modification of the present invention.

Referring now to FIG. 4 where the electrical circuit and the structure are schematically indicated, and considering first the fastener driving tool 16, there is schematically indicated the winding 50 and the serially connected switches 40, 82 and 83 associated therewith connected in series. Also, the conductors 88a and 88b which are included in the insulated twin conductor 88 in FIG. 2 are illustrated. The insulated twin conductor 91 is designated by the conductors 91a and 91b which are connected to a normally open switch 95 which is also disposed within the hollow handle portion 20b and controlled by the knob or button 90. It is intended that each stepwise actuation of the button 90 to the next adjacent setting will operate a stepping motor 96 selectively to adjust a switching member 97 to its next adjacent and corresponding position. For illustrative purposes, the circuitry has been only schematically shown but motor 96 should move switching arm member 97 one step at a time in either direction in accordance with movement of button 90 one step at a time.

In order to supply electric energy to stepping motor 96 as well as other devices in unit 17, there is included in unit 17 a transformer 98 having a primary winding 99, a pair of control secondary windings 100 and 101 and a main high voltage tapped secondary winding 102. The control secondary winding 100 is preferably a low voltage winding supplying six, twelve or twenty-four volts and is connected to conductor 91a and one terminal of stepping motor 96. Whenever the switch 95 is closed, the stepping motor 96 will be momentarily energized and cause switching member 97 to step forward or backward one switching step as selected by button 90. Preferably button 90 includes suitable indicating means indicating to the user the particular setting of switching member 97. When the power supply is all contained in handle chamber 23, obviously the knob 90 will be directly connected to the means to be controlled and the remote control arrangement illustrated may be dispensed with. Preferably, vaporproof couplings are provided where the cable 19 and the supply conductor 18 enter control unit 17 and tool 16. As illustrated in FIG. 4, the primary winding 99 of the transformer 98 is connected to the input conductor 18 which may be connected to any suitable source of alternating current. The fuse 93 and On-Off switch 94a controlled by control knob 94 in a well-understood manner, are connected in series with the primary winding 99. The indicating light 92 is connected across the winding 99, and, of course, is energized whenever the switch 94a is closed.

To supply the high energy necessary for driving a staple or nail which might be several inches in length, there is provided an energy storage device, generally designated at 103, which may comprise one or more capacitors as described in detail hereinafter. The output of this energy storage device 103 is connected to conductors 88a and 88b through the contacts 104a of a main power relay or contactor 104 having a winding 104b. The energy storage device 103 is specifically illustrated as a bank of capacitors although it should be understood that a single capacitor might be employed. As illustrated, capacitors 105, 106 and 107 have a common terminal thereof connected to conductor 88b through the contacts 104a of power relay 104. The other terminals thereof are respectively connected to a series of contacts 97a, 97b and 97c, which are adapted to be engaged by the switching member 97, the latter being connected to conductor 88a. As illustrated in FIG. 4 of the drawings, the switching member 97 connects the single capacitor 105 across the conductors 88a and 88b when contacts 104a are closed. When the switching member 97 is moved one step in a counterclockwise direction, as viewed in FIG. 4, it will engage both contacts 97a and 97b thus connecting capacitors 105 and 106 in parallel across conductors 88a and 88b when contacts 104a are closed. When the switching member 97 is moved another step in a counterclockwise direction, as viewed in FIG. 4 of the drawings, all three contacts 97a, 97b and 97c are interconnected so that the three capacitors 105, 106 and 107 are connected in parallel across conductors 88a and 88b and, hence, across the winding 50 of the air solenoid when contacts 104a of power relay 104 are closed.

It should be understood that the switching arrangement for switching the capacitors 105, 106 and 107 provides drive penetration control of the fastener to be driven by the electrically actuated driving tool 16. For safety reasons and also to equalize capacitor leakage a resistor is connected across each capacitor. As illustrated, leakage resistors 108, 109 and 110 are connected across the respective capacitors 105, 106 and 107. These resistors will, of course, bleed off the voltage across the capacitor when the power supply is de-energized. In order that the capacitors 105, 106 and 107 may be connected successively in parallel as desired without arcing at the contacts 97a, 97b and 97c, there are provided equalization resistors 111 and 112, the resistor 111 being connected across the contacts 97a and 97b and the resistor 112 being connected across the contacts 97b and 97c.

For the purpose of charging the capacitors 105, 106, 107, either 105 alone or one or more in parallel with it, there is provided a charging circuit including a full wave rectifier 114. One terminal of the direct current output of rectifier 114 is connected to the energy storage unit 103 through a conductor 115, a charging rate control resistor 116 having an adjustable tap 116a and a conductor 117. The other direct current output terminal of rectifier 114 is connected by a conductor 118 directly to the common terminal of the three capacitors 105, 106 and 107. The alternating current input to full wave rectifier 115 is supplied from the secondary winding 102. This secondary winding is provided with a plurality of taps designated as 102a, 102b, 102c and 102d, and a movable contact 94b is selectively adjustable to be connected to any of the taps 102a, 102b, 102c or 102d, as desired. This movable contact 94b is controlled by the knob 94 as mentioned earlier. It is electrically connected to one of the input terminals of the full wave rectifier 114 by conductor 120. The other input terminal of rectifier 114 is connected to secondary winding 102 by a conductor 121. In a device built in accordance with the present inventions, the capacitors 105, 106 and 107 each comprised a one thousand microfarad unit and the contacts 104a of power relay 104 withstood momentary current surges of one hundred amperes. In order to increase the contact life of contacts 104a an arc suppression circuit comprising the resistor 123 and a rectifier 124 were serially connected across the contacts 104a. The rectifier is connected to prevent discharge of the associated capacitors in energy storage device 103.

For the purpose of energizing the winding 50 of the driving solenoid in response to actuation of the controls, such as the trigger 80, there is provided a control circuit for energizing the power relay 104. In the arrangement disclosed in FIG. 4, the power relay 104 is only energized once for each actuation of the trigger 80. As illustrated, the control secondary winding 101 of the transformer 98 supplies power to a control circuit for selectively actuating the power relay 104. This control secondary winding 101 may supply power at a relatively low voltage, such as six, twelve or twenty-four volts similar to control secondary winding 100. As illustrated, the power relay 104 is energized momentarily by the voltage stored in a capacitor 126. The capacitor 126 is connected across the winding 101 through the normally closed contact 127a of a control relay 127, an adjustable charging resistor 128 having a movable tap 128a and a rectifier 129. A suitable smoothing capacitor 130 may be employed with the rectifier 129 to insure an effective direct current charging voltage for the capacitor 126. The relay 127 has a winding 127b which is connected across the control secondary winding 101 through the conductors 87a and 87b and the three serially arranged switches 40, 82 and 83 associated with the tool 16 and described heretofore. It will be understood that the conductors 87a and 87b are contained within the insulated twin conductor 87 shown in FIG. 2 of the drawings. Consequently, whenever the trigger switch 82 and the safety switch 83 are closed, assuming that there are sufficient staples or nails within the magazine 21 so that switch 40 is also closed, the control relay 127 will be energized to open the charging circuit of the capacitor 126 and to close a discharge circuit including the normally open contact 127c of relay 127 which connects the capacitor 126 directly across the winding 104b of power relay 104 to cause contacts 104a to be closed.

In view of the detailed description included above the operation of the electric powered tacker or nailer described above will readily be understood by those skilled in the art. The charging rate controls 116 and 128 will, of course, be adjusted and the user will set the movable contact 94b of the tap changer of the transformer 98 to give the desired voltage. The switching member 97 will be adjusted for the desired drive penetration, depending upon the length of staple or nail employed and the nature of the material into which it is to be driven. When the necessary staples or nails are provided in the magazine assembly 21, the contacts of switch 40 are closed, and, of course, when the nose of the tool 16 is placed against a workpiece the safety switch 83 will be closed. When the On-Off switch 94a is closed, the control capacitor 126 will become charged as will also one or more of the capacitors in energy storage device 103 that is connected in the charging circuit comprising the output of full wave rectifier 114. When the trigger 80 is actuated, relay 127 is energized so that the charge on capacitor 126 is applied to the winding 104b of power relay 104 to close main contacts 104a with the result that the energy stored in the energy storage device 103 is supplied to the winding 50 and a staple or nail disposed in drive track 25 ahead of driver 26 is driven in the desired manner. In the copending applications referred to above, in several embodiments, the transformer 98 has been completely dispensed with and the control relay 127 and power relay 104 have been eliminated, and in their stead some of the new solid state devices with no moving parts have been employed. As a matter of fact in one of the copending applications, the energy storage device has also been completely eliminated and the entire control shown in unit 17 has been incorporated in the handle 20b of the electrically powered tool 16.

Figure 6:
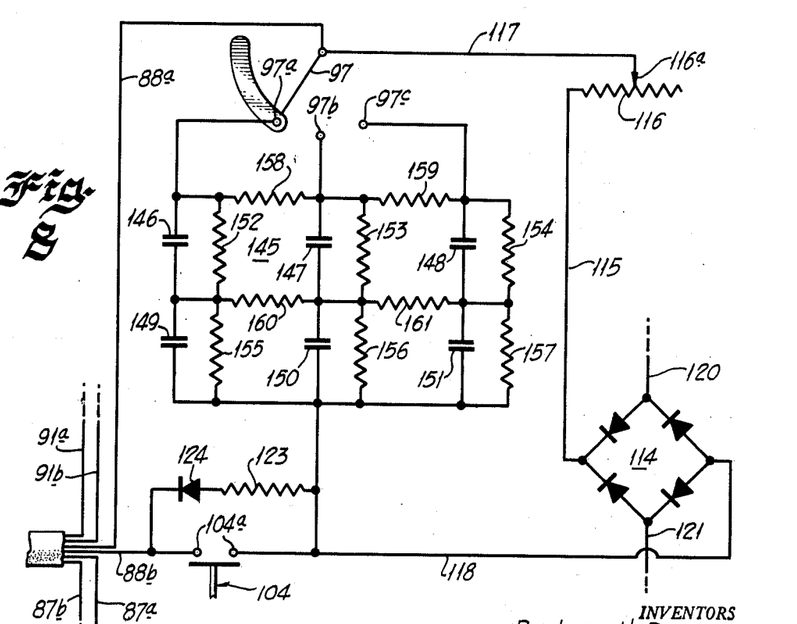
FIG. 6 is a schematic diagram of a portion of FIG. 4 illustrating still another modification of the present invention.

In the arrangement described in connection with FIG. 4 the fastener driving tool 16 requires separate actuations of either the trigger 80 or the yoke 33 to cause firing thereof. In certain applications, it might be desirable to have repetitive firing occur so long as the trigger 80 remains actuated. In FIG. 6 of the drawings such a modification is illustrated in which the corresponding parts are designated by these same reference numerals as in FIG. 4 of the drawings. As there illustrated, the control relay 127 and the power relay 104 are eliminated and the contacts 104a are controlled by a contactor 131 having a winding 131a and, in addition to the normally open contacts 104a, a set of normally closed contacts 131b. The charging circuit for the capacitor 126 is very similar to that disclosed in FIG. 4 of the drawings except that instead of going through the normally closed contact 127a of the control relay 127, it goes through the normally closed contacts 131b of the relay 131. It will be apparent that, as in the FIG. 4 arrangement, when the switch 94a is closed the capacitor 126 is charged in accordance with the setting of the charging rate control resistor 128. As long as the switches 40, 82 and 83 remain closed, the capacitor 126 will be successively charged and then discharged through winding 131a of relay 131. Upon complete discharge of capacitor 126 the relay 131 will become de-energized to reclose the contacts 131b and permit successive recharging of capacitor 126. The arrangement in FIG. 6, therefore, provides a repetitious firing circuit, and as long as the trigger 80 remains actuated the resistor 128 effectively controls the firing rate which is determined by the charging time of the capacitor 126.

Figure 5:
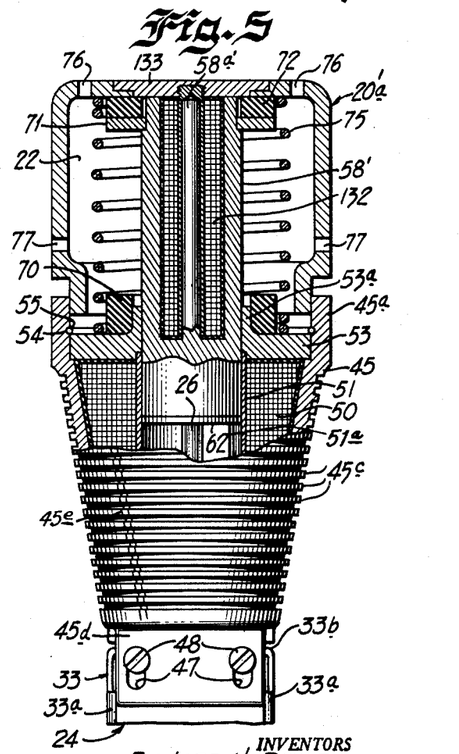
FIG. 5 is a fragmentary view similar to FIG. 3 illustrating another modification of the present invention.

It should be understood that instead of utilizing the return spring 65 to return the armature 58 an electrical armature return may be employed and in FIG. 5 of the drawings such a modification is illustrated. The corresponding parts of FIG. 5 are designated by the same reference numerals as in FIG. 3. The head is designated as 20a' and the armature is designated as 58' to distinguish from the corresponding parts of FIGS. 2 and 3. The upper portion of the armature 58 is modified to include the central leg 58a' in the space occupied by the spring 65 in FIG. 3 of the drawings. A suitable return winding 132 is provided surrounding the central leg 58a' of armature 58'. In order to complete the flux path for the return winding 132, the top central portion of the head 20a' is formed of iron or magnetic material and is indicated as 133 in FIG. 5 of the drawings. This element 133 includes an integral annular extension 133a concentric with winding 132 and armature 58a to provide the flux return path for the flux produced by the winding 132. It will be appreciated that suitable means will energize the armature return winding 132 momentarily to return the armature 58' at the end of each driving stroke and this energization circuit can include a suitable switch closed when the armature reaches its lowermost position, as will be understood by those skilled in the art.

Figure 7:
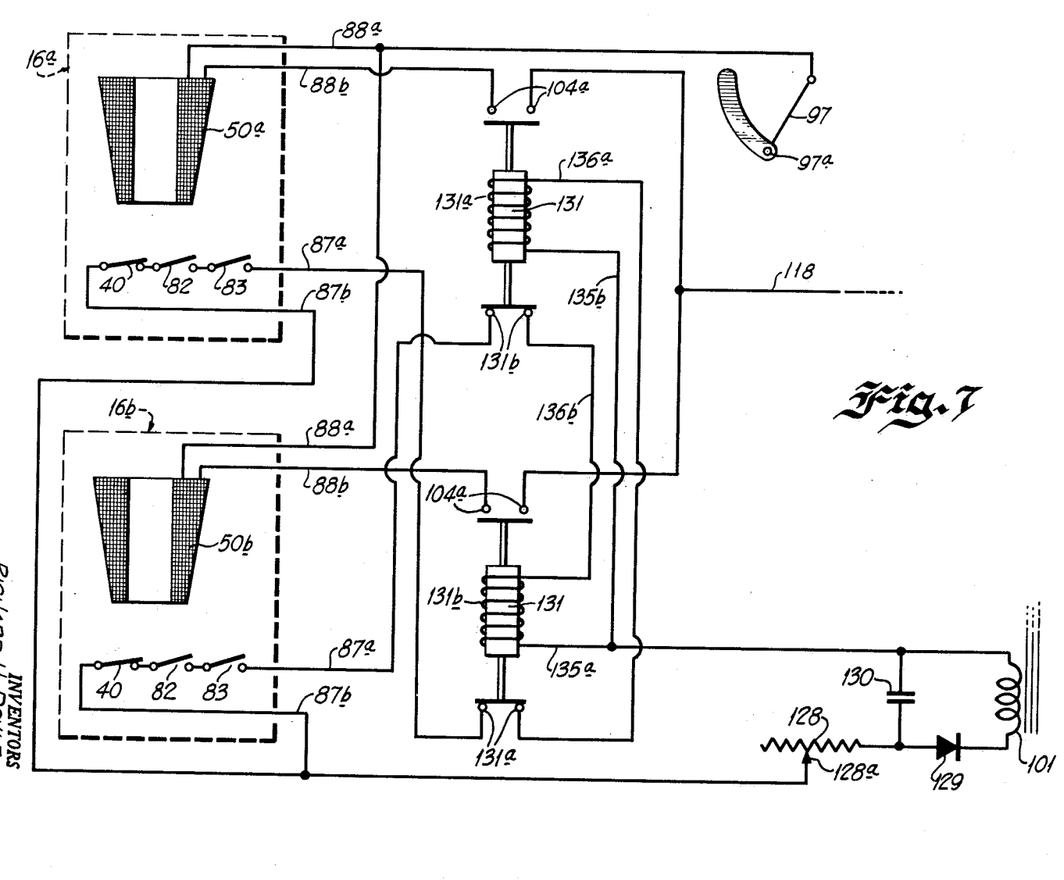
FIG. 7 is a schematic diagram illustrating a modified control circuit for use with the present invention.

While only a single tool 16 has been illustrated as supplied with power from control unit 17, it is desirable that several tools be supplied from a single power supply. In such an arrangement, it is essential that only one tool can be fired at one given instant so that if the triggers 80 on both tools were actuated almost simultaneously, the first one would fire immediately, followed by the firing of the second tool. Such an arrangement is shown in FIG. 7 of the drawings where the corresponding parts are designated by the same reference numerals as in the preceding drawings. The windings 50 of two separate power tools 16a and 16b are illustrated as 50a and 50b and the switches 40, 82 and 83 of each tool are also indicated. Power to each of these tools is supplied from the switching member 97 of the energy storage device through the conductors 88a and the contacts 104a to the conductor 118 exactly as shown in FIGS. 4 and 6 of the drawings. However, a pair of relays 131 identical with the relay 131 of FIG. 6 are provided, one for each of the tools 16a and 16b. As illustrated in FIG. 7, the uppermost of the relays 131 controls the contacts 104a for the tool 16a while the other relay 131 controls the contacts 104a for the tool 16b. Each of these relays includes a winding and a set of normally closed contacts which are designated as in FIG. 6 of the drawings. Rectified electrical energy from the secondary winding 101 of the transformer 98 is supplied to a common terminal of the two windings 131a of the relays 131 through conductors 135a and 135b, respectively, while the other terminals of these windings are connected respectively to one of the normally closed contacts 131b of the opposite relay 131 by conductors 136a and 136b, respectively. The other one of the normally closed contacts 131b are connected to conductors 87a of the tools 16a and 16b, respectively. It will be apparent with this arrangement that whichever of the two relays 131 becomes energized first, it will prevent the firing of the other tool until the first tool has been fired and the associated relay de-energized to close its contacts 131b.

In FIG. 8 of the drawings, there has been illustrated an energy storage device 145 which could replace the energy storage device 103 described above where greater driving power is desired. The corresponding parts of FIG. 8 are designated by the same reference numerals as in FIGS. 4 and 6 of the drawings. As illustrated, energy storage device 145 comprises a plurality of capacitors arranged both in series and in parallel configuration which makes it possible to supply higher voltages in the event that more energy is desirable. As there illustrated, a plurality of capacitors 146, 147, 148, 149, 150 and 151 are shown connected in a series parallel arrangement with leakage resistors 152, 153, 154, 155, 156 and 157, and equalizing resistors 158, 159, 160 and 161 arranged as in FIG. 4 of the drawings. In view of the detailed description included above, the operation of the modification of FIG. 8 will readily be understood by those skilled in the art and it merely illustrates a way of getting higher voltages where very long nails or staples are desired to be driven.

Figures 9, 10, 11:
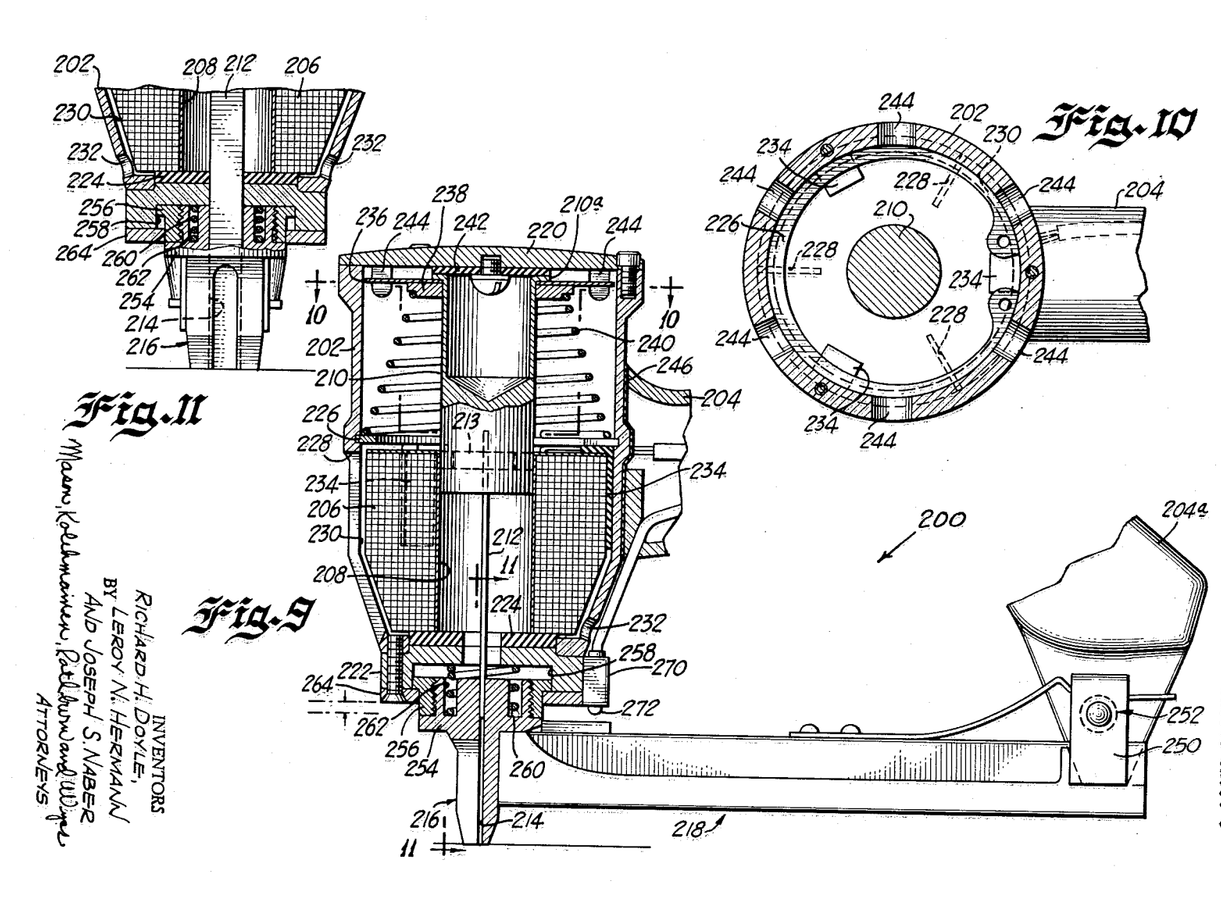
FIG. 9 is a fragmentary sectional view of an electrically operated fastener driving tool forming a second embodiment of the invention.
FIG. 10 is a sectional view taken along line 10—10 in FIG. 9.
FIG. 11 is a sectional view taken along line 11—11 in FIG. 9.

FIGS. 9–11 of the drawings illustrate an electrically operated stapler or tacker 200 which embodies the present invention and which is similar to the tool 16. The stapler 200 includes new and improved means for cooling the operating winding means in the stapler as well as novel means for insuring that the drive track of the stapler remains in engagement with a workpiece in spite of recoil. The tacker 200 includes a housing formed by a generally cylindrical head portion 202 to which is secured a separate and rearwardly extending handle 204. The tacker 200, which can be operated by the control means described both above and in the listed copending applications, includes a winding means 206 disposed in the housing 202 and having an axially extending opening 208 in which is slidably disposed the lower end of a magnetic armature 210 to which the upper end of a fastener driving blade 212 is secured by a pin 213. The lower end of the driver blade 212 is slidably mounted in a drive track 214 formed in a nosepiece assembly 216. Suitable fasteners, such as staples or nails, are supplied to the drive track 214 by a magazine assembly, indicated generally as 218, which is rigidly secured to the nosepiece assembly 216 and which is pivotally mounted to a rear portion 204a of the handle 204.

When the tool 200 is operated, as by the actuation of switch means (not shown) carried on the handle 204, the winding 206 is energized to move the armature 210 and the connected driver blade 212 downwardly so that the blade 212 engages and drives a fastener supplied by the magazine assembly 218. During this downward movement, a vane or air impelling means secured to the armature 210 draws ambient air into the interior of the housing 202 through openings in an upper portion thereof and forces this air downwardly around the outer surface of the winding 206 which is spaced from the housing 202. This air is discharged through openings in the lower end of the housing 202.

To provide means for insuring that the nosepiece assembly 216 remains in engagement with the workpiece during the fastener driving operation, the pivoted connection of this assembly and the magazine assembly 218 to the handle 204 is utilized. When the tool 200 is to be operated, the nosepiece assembly 216 is placed against the workpiece, and this component and the magazine assembly 218 are pivoted relative to the remainder of the tool. Thus, any recoil produced by the operation of the tool can be absorbed by displacing the housing 202 and the handle 204 relative to the assemblies 216 and 218 which remain in position so that the nosepiece assembly 216 contacts the workpiece.

Referring now more specifically to the housing 202, this housing is generally cylindrical in form and preferably is fabricated from a nonmagnetic material. The open upper end of the housing 202 is closed by a cover 220, and the open lower end of this housing is closed by a nonmagnetic member 222. The winding 206, which is similar to the winding 50 provided in the tool 16, is disposed in the lower end of the housing 202 resting on a resilient element 224 that engages the lower end of the armature 210 at the end of its power stroke to cushion the termination of the power stroke. The winding 206 is secured in position by a ring 226. To prevent the lower portion of the housing 202 surrounding the coil 206 from providing the effect of a shorted turn, this portion of the housing 202 is provided with one or more longitudinally extending and circumferentially spaced slots 228.

To provide means for cooling the winding 206, this winding is supported within the lower end of the housing 202 spaced from engagement therewith so that a somewhat annular passageway or air conveying means 230 is provided interposed between the housing 202 and the winding 206 through which air can be moved. The passageway or space 230 communicates with the plurality of slots 228 and with a plurality of openings 232 formed in the lower end of the member 202. The winding 206 is held in a position spaced from the inner wall of the lower portion of the housing member 202 by a plurality of generally L-shaped spacers 234 which are interposed between the winding 206 and both the inner surface of the lower portion of the housing 202 and the lower surface of the securing ring 226.

To provide means for driving or impelling air through the passageway or space 230, the upper end of the armature 210, which is recessed to reduce its mass, is provided with a vane or plunger 236 that is interposed between a flange 210a on the armature and a collar 238. A conical armature return spring 240 is interposed between the collar 238 and the upper surface of the ring 226 and normally holds the upper end of the armature 210 in engagement with a resilient element 242. This element is carried on the cover 220 and is used to cushion the return movement of the armature 210.

When the tool 200 is operated and the winding 206 is energized, the armature 210 and the vane or air impelling element 236 move downwardly against the force of the compression spring 240. During this movement, the element 236 impels or forces air drawn into the interior of the upper portion of the housing 202 through a plurality of intake or inlet ports or openings 244 downwardly through the annular space or passageway 230 and discharges this air through the slots 228 and the openings 232. Since the slots 228 are very small and can be closed, if desired, by a nonconductive material, the bulk of the air is discharged through the openings 232 and passes substantially completely around and along the entire length of the outer surface of the winding 206. When the winding 206 is deenergized, the return spring 240 restores the armature 210 and the driver blade 212 to the normal position shown in FIG. 9. During this return movement, the suction created by the upward movement of the plunger or vane 236 draws air into the space 230 through the opening 232. This flow of air during the oppositely directed movements of the armature 210 incident to each operation of the tool 200 removes the heat generated by the energization of the winding 206 and maintains the operating temperature of the tool 200 within the desired temperature range.

In certain applications, such as those in which the components for controlling the energization of the winding 206 are to be carried in or on the handle 204, it is desirable to insure that the heat from the winding means 206 that is not removed by the cooling means described above is not transmitted to the handle 204. Accordingly, a layer or body of heat insulating material 246 (FIG. 9) is interposed between the separate handle 204 and the housing 202. This heating insulating material can be applied to either of the members 202 or 204 or can be formed as a gasket that is interposed between these two components during their assembly. The use of the body 246 of heat insulating material retards the transmission of heat generated by the winding 206 to the handle 204 and protects any electronic components carried therein from the adverse effects of excessive temperature rises. The above-identified application of Richard H. Doyle et al. Serial No. 161,727, discloses one type of electrically operated tool in which the operating components for controlling the energization of the winding 206 are carried in or on the handle 204.

As indicated above, the nosepiece assembly 216 and the magazine assembly 218 are pivotally mounted relative to the remainder of the tacker 200 to provide means for maintaining the nosepiece assembly 216 in engagement with the workpiece when the tool 200 is operated. The rear end of the magazine assembly 218 includes a generally U-shaped element 250 that is pivotally connected to the rear end 204a of the handle 204 by a hinge or pivot assembly indicated generally at 252. To provide means for movably connected the nosepiece assembly 216 with the housing 202, the assembly 216 includes a nosepiece element 254 defining the drive track 214 and having a threaded boss at its upper end on which is threadedly mounted a flanged collar 256. This collar is disposed within an opening 258 in the lower wall of the element 222. A compression spring 260 disposed within a circular opening 262 in the boss portion of the nosepiece element 254 engages a lower surface of the member 222 within the opening 258 to normally bias the nosepiece assembly 216 and the magazine assembly 218 to the position illustrated in FIG. 9. In this position, the lip or flange on the collar 256 engages the upper edge of an annular plate 264 that is secured to the member 222 at the lower end of the housing 202.

When the tool 200 is to be operated, the nosepiece assembly 216 is placed against the workpiece, and the handle 204 and the housing 202 are moved downwardly against the action of the compression spring 260 to the position shown in FIG. 11 which is determined by the engagement of the upper end of the collar 256 and the boss portion of the nosepiece element 254 with the lower wall of the member 222 within the opening 258. When the tool 200 is then operated by energizing the winding 206, the recoil produced by the force required to place the armature 210 in motion and which results from the oppositely directed components of force tending to move the armature 210 downwardly and the winding 206 in the housing 202 upwardly is absorbed by permitting the housing 202 and the handle 204 to move upwardly in a clockwise direction about the pivotal axis of the assembly 252. During this movement, the compression spring 260 holds the lower end of the nosepiece assembly 216 in engagement with the workpiece and insures that the fastener supplied by the magazine 218 is properly driven. The drive track 214 and the blade 212 are so proportioned that the movement of the nosepiece assembly 216 does not cause the blade 212 to bind in the drive track 214.

The movement of the nosepiece assembly 216 and the magazine assembly 218 relative to the remainder of the tool 200 can be used to actuate a safety switch means, such as the switch means 38 in the tool 16, to insure that the nosepiece assembly 216 is in engagement with the workpiece prior to the operation of the tool 200. More specifically, a safety switch 270 is secured to the member 222 with a switch actuator element 272 disposed immediately above an upper surface of the adjacent portion of the magazine assembly 218. When the tool 200 is placed against the workpiece and depressed so that the magazine assembly 218 and the nosepiece assembly 216 pivot in a clockwise direction about the hinge assembly 252, the actuator element 272 is engaged and actuated to operate the switch 270.

Although the present invention has been described with reference to several embodiments thereof, it should be understood that numerous other modifications and embodiments can be devised by those skilled in the art that will fall within the spirit and scope of the principles of this invention.

What is claimed as new and desired to be secured by Letters Patent of the United States is:

1. In an electrically operated tool for driving fasteners, a housing having a generally inclined portion defining a chamber having an inclined wall surface, winding means having an inner wall defining an axially extending opening and an outer wall that is at least partially inclined inwardly toward the axis of said opening, said winding being disposed in said chamber with the inclined wall on the winding means adjacent the inclined wall of the chamber, and armature means movable in said axially extending opening and including work engaging means extending out of said housing, said armature means normally being disposed with an end portion within one end of the axial opening and being movable through the axial opening in the direction in which the outer wall of the winding means inclines inwardly toward the axial opening when the winding means is energized.

2. The electrically operated tool set forth in claim 1 including at least one slot in said housing in the portion thereof adjacent said winding means extending generally parallel to the axis of said axially extending opening.

3. An electrically operated tool for driving fasteners comprising a housing defining a chamber, winding means disposed in said chamber, fastener driving means including armature means disposed adjacent said winding means, nosepiece means movably receiving said fastener driving means and adapted to engage a workpiece, said nosepiece means also being adapted to receive fasteners to be driven, and resiliently biased means connecting said nosepiece means and said housing to permit relative movement between said nosepiece means and said housing to prevent any recoil due to energizing said winding means from displacing said nosepiece from engagement with said workpiece.

4. An electrically operated tool for driving fasteners comprising a housing defining a chamber, winding means disposed in said chamber, fastener driving means including armature means disposed adjacent said winding means, nosepiece means movably receiving said fastener driving means and adapted to engage a workpiece, a magazine assembly rigidly secured to said nosepiece means for supplying fasteners to be driven by said fastener driving means, and interconnecting means interconnecting said housing and said nosepiece means for movement relative to each other in response to recoil forces produced by the energization of said winding means so that said nosepiece means remains in engagement with the workpiece.

5. The tool set forth in claim 4 in which said interconnecting means includes means mounting said housing and said nosepiece means for pivotal movement relative to each other.

6. The tool set forth in claim 4 in which said interconnecting means includes means mounting said housing and said nosepiece means for rectilinear movement relative to each other.

7. An electrically operated tool comprising a nonmagnetic housing having a tapered portion and defining a chamber having a tapered portion, winding means defining an axial opening and being tapered to provide a greater number of turns at its upper end than at its lower end, said winding means being disposed in said chamber with the tapered portion of the winding means being positioned in the tapered portion of the chamber, nosepiece means carried on said housing disposed adjacent the lower end of said winding means and including a drive track, a magnetic armature movable downwardly in said axial opening by the energization of said winding means, and fastener driving means actuated by said armature and movable in said drive track.

8. An electrically operated tool for driving fasteners comprising a housing, magazine means carried on said housing for feeding fasteners to be driven from a supply thereof, fastener driving means in said housing including winding means and a fastener driving element actuated by said winding, first switch means responsive to the presence of an adequate supply of fasteners in said magazine means, manually operable second switch means carried on said housing, and control means including said first and second switch means for controlling the energization of said winding means.

9. The electrically operated tool set forth in claim 8 including third switch means operated when said tool is placed in engagement with a workpiece, and in which said control means includes said third switch means.

10. An arrangement for driving fasteners comprising a portable housing, fastener driving means in said portable housing including winding means and fastener driving means having a magnetic portion disposed adjacent said winding means, switch means on said housing, power supply means remote from said housing, flexible cable means electrically interconnecting said switch means and winding means with said power supply means and including a pair of conductors connecting the power supply means to the winding means and additional conductor means connecting the power supply means to the switch means, and control circuit means including said switch means and the additional conductor means in said cable means for controlling the power supply means to energize the winding means over the pair of conductors.

11. The arrangement set forth in claim 10 in which said control circuit means includes means carried on said housing and effective over said cable means to control the quantity of energy supplied over said cable means from said power supply means to said winding means.

12. The arrangement set forth in claim 10 in which said control means includes means for controlling said power supply means to intermittently and automatically energize said winding means at timed spaced intervals.

13. An arrangement for driving fasteners comprising a pair of electrically operated fastener driving tools, a single power supply circuit remote from said tools and capable of supplying a predetermined discrete quantity of energy for operating a single tool, cable means connecting said tools in common to said power supply circuit, switch means on each of said tools for controlling the energization of the tool by said power supply circuit over said cable means, and circuit means connected to said power supply circuit and said switch means for preventing the concurrent operation of said pair of tools by said power supply circuit.

14. A fastener driving tool comprising a housing including a drive track, fastener magazine means carried on the housing and adapted to supply fasteners to the drive track, fastener driving means in the housing including both a driver element slidably mounted in the drive track and an actuating element for actuating the drive element, power unit in the housing for operating the actuating means, first manually actuated means carried on the housing, second means operated in response to the depletion of the supply of fasteners in the fastener magazine means to a predetermined point, and control means including the first and second means for operating the power unit when the first means is manually actuated and an adequate supply of fasteners is provided in the fastener magazine means.

15. A fastener driving tool comprising a housing including a drive track, fastener magazine means carried on the housing and adapted to supply fasteners to the drive track, fastener driving means in the housing including both a driver element slidably mounted in the drive track and an actuating element for actuating the driver element, power unit in the housing for operating the actuating means, first manually actuated means carried on the housing, second means operated in response to the depletion of the supply of fasteners in the fastener magazine means to a predetermined point, third means actuated by placing the drive track adjacent a workpiece, and control means including the first, second, and third means for operating said power unit only when an adequate supply of fasteners is provided in the fastener magazine means and the drive track is adjacent the workpiece.

16. A fastener driving tool comprising a housing including a drive track, fastener magazine means carried on the housing and adapted to supply fasteners to the drive track, fastener driving means in the housing including both a driver element slidably mounted in the drive track and an actuating element for actuating the driver element, power unit in the housing for operating the actuating means, first means operable by engagement with a workpiece and including a portion movably mounted adjacent the lower end of the drive track, control means including the first means for controlling the operation of the power unit, and second means responsive to the quantity of fasteners in the fastener magazine means for preventing operation of the power unit by the control means when the supply of fasteners in the fastener magazine means is reduced below a given amount.

17. A fastener driving tool comprising a housing including a drive track, fastener magazine means carried on the housing, pusher means in the magazine means for feeding fasteners into the drive track from the magazine means, fastener driving means in the housing including both a driver element slidably mounted in the drive track and an actuating member movably mounted in the housing, a power unit in the housing for operating the actuating member, first manually actuated means, control means including the first manually actuated means for controlling the operation of the power unit, and second means controlled by the position of the pusher means for preventing the operation of the power unit by the control means when an adequate supply of fasteners is not provided in the fastener magazine means.

18. A fastener driving tool comprising a housing including a drive track, fastener magazine means carried on the housing, pusher means in the magazine means for feeding fasteners into the drive track from the magazine means, fastener driving means in the housing including both a driver element slidably mounted in the drive track and an actuating member movably mounted in the housing, a power unit in the housing for operating the actuating member, first means actuated by engagement of a workpiece, control means controlled by the first means for controlling the operation of the power unit, and second means responsive to the position of the pusher means for preventing the operation of the control means by the first means when an adequate supply of fasteners is not provided in the fastener magazine means.

References Cited in the file of this patent

UNITED STATES PATENTS

| 594,905 | Robinson | Dec. 7, 1897 |
| 1,239,644 | Tuttle | Sept. 11, 1917 |
| 1,993,781 | Hampton | Mar. 12, 1935 |
| 2,979,725 | Wandel | Apr. 18, 1961 |

FOREIGN PATENTS

| 216,983 | Austria | Aug. 25, 1961 |